United States Patent [19]

Iino et al.

[11] Patent Number: 4,542,001

[45] Date of Patent: Sep. 17, 1985

[54] FINE PARTICULATE CRYSTALLINE ALUMINUM ORTHOPHOSPHATE AND METHOD FOR PREPARING SAME

[75] Inventors: Shinji Iino; Kensaku Maruyama; Motoi Takenaga; Kazuhiko Muramoto, all of Shimonoseki; Mitsutomo Tsuhako, Itami, all of Japan

[73] Assignee: Mitsui Toatsu Chemicals, Inc., Japan

[21] Appl. No.: 525,606

[22] Filed: Aug. 22, 1983

[51] Int. Cl.[4] .............................................. C01B 25/26
[52] U.S. Cl. ..................................... 423/311; 423/308
[58] Field of Search ................................. 423/308, 311

[56] References Cited

U.S. PATENT DOCUMENTS

| 3,943,231 | 3/1976 | Wasel-Nielen et al. | 423/311 |
| 4,021,528 | 5/1977 | Schlegel | 423/311 |
| 4,083,933 | 4/1978 | Schlegel | 423/311 |
| 4,294,808 | 10/1981 | Wasel-Nielen et al. | 423/311 |

FOREIGN PATENT DOCUMENTS 704951  3/1965  Canada ................................. 423/311

Primary Examiner—John Doll
Assistant Examiner—Wayne A. Langel
Attorney, Agent, or Firm—Scully, Scott, Murphy & Presser

[57] ABSTRACT

A fine particulate crystalline aluminum orthophosphate is obtained by reacting an aqueous phosphoric acid solution with an aluminum oxide under heating in an organic solvent which is incompatible with water.

6 Claims, No Drawings

FINE PARTICULATE CRYSTALLINE ALUMINUM ORTHOPHOSPHATE AND METHOD FOR PREPARING SAME

BACKGROUND OF THE INVENTION

The present invention relates to a new method for preparing a crystalline aluminum orthophosphate (AlPO$_4$), particularly a fine particulate crystalline aluminum orthophosphate.

Crystalline AlPO$_4$ has been used as the raw material of optical glasses and various ceramics, as a catalyst, etc. Further, since AlPO$_4$ has a crystal structure similar to that of rock crystal (SiO$_2$), it has recently been considered promising as a vibrator material (piezoelectric material) like LiTaO$_3$ and rock crystal.

Conventional crystalline AlPO$_4$ has been produced by the following methods:

(1) Mixing aluminum hydroxide or aluminum oxide with orthophosphoric acid and calcining the mixture. (Calcining Method)

(2) Reacting an aqueous solution of a soluble phosphate with an aqueous solution of an aluminum salt and obtaining aluminum phosphate as a precipitate. (Precipitating Method)

However, according to the above calcining method (1), it is necessary that a solid product obtained by reacting aluminum hydroxide or aluminum oxide with phosphoric acid at a temperature of about 130°–270° C. be further calcined at a high temperature of 300°–1,300° C. for 5 to 20 hours. Consequently, this calcining method involves problems such that the manufacturing time becomes longer and the consumption of heat energy is increased and that the reaction apparatus requires an expensive material having corrosion resistance to phosphoric acid which is heated to a high temperature. According to the above precipitating method (2), an aqueous solution of a phosphate of, for example, sodium, potassium or ammonium and an aqueous solution of an aluminum salt such as, for example, aluminum sulfate are reacted together to obtain aluminum phosphate as a precipitate. However, the aluminum phosphate obtained by this precipitating method is found to be amorphous by X-ray diffraction, and in order to obtain a crystalline AlPO$_4$, it is necessary to calcine this precipitate at a temperature above 1,000° C. Thus, according to either of the above conventional manufacturing methods, it is necessary to perform calcination at a high temperature in order to obtain a crystalline AlPO$_4$. Additionally, in such known manufacturing methods, it is unavoidable that impurities incorporate into product due to corrosion of the material of the apparatus in the calcining step. Thus, those methods cannot fully satisfy the requirements of the electronic industry and other recent industrial techniques which require a specially high purity.

SUMMARY OF THE INVENTION

An object of the present invention is to overcome the above-mentioned disadvantages associated with the conventional methods.

An another object of the present invention is to provide a method for preparing a fine particulate crystalline aluminum orthophosphate of high purity at a relatively low temperature.

An another object of the present invention is to provide a novel fine particulate crystalline aluminum orthophosphate.

Other objects and advantages of the present invention will be apparent from the following description.

The present invention resides in the production of a fine particulate crystalline aluminum orthophosphate, characterized by reacting an aqueous phosphoric acid solution with an aluminum hydroxide and/or an aluminum oxide at an elevated temperature in an organic solvent capable of forming two phases with water.

According to the above method of the invention, a fine particulate crystalline aluminum orthophosphate of high purity can be obtained by a heterogeneous liquid phase reaction and that at a relatively low temperature. The crystalline aluminum orthophosphate thus obtained has a particle diameter ranging from 1 to 100 microns. Such a crystalline orthophosphate has heretofore not been known.

DETAILED DESCRIPTION OF THE PREFERRED EMBODIMENTS

Examples of the aluminum compound(s) used in the present invention include various aluminum hydroxides such as gibbsite, bayerite, boehmite and diaspore as well as various aluminas of $\alpha$, $\gamma$, $\delta$, $\theta$, $\rho$, $\epsilon$, $\chi$, $\eta$ and $\kappa$ types.

The higher the purity of the aluminum compound(s) and aqueous phosphoric acid solution used, the easier to obtain product of high purity and the more desirable, but their purities are not specially limited. Starting materials of appropriate purities may be selected in accordance with the purity required of AlPO$_4$. Generally, aluminum hydroxides, aluminum oxides and aqueous phosphoric acid solutions of the industrial grade are fully employable.

In the present invention, if the reaction mole ratio of phosphoric acid to aluminum compound(s) is set in the range of 0.8 to 1.8, preferably 1.0 to 1.3, in terms of P$_2$O$_5$/Al$_2$O$_3$, the yield of the resultant crystalline AlPO$_4$ will be increased. Since the P$_2$O$_5$/Al$_2$O$_3$ mole ratio in the desired AlPO$_4$ is theoretically 1.0, the reaction ought to be completed at the reaction mole ratio of phosphoric acid to aluminum compound(s) of 1.0, but in the actual reaction an excess amount of P$_2$O$_5$ over Al$_2$O$_3$ will permit the reaction to proceed more easily. However, a P$_2$O$_5$/Al$_2$O$_3$ mole ratio exceeding 1.8 is not desirable because it would cause lowering of the crystallization degree of AlPO$_4$. On the other hand, in case the P$_2$O$_5$/Al$_2$O$_3$ mole ratio is less than 1.0, it is possible that unreacted aluminum compound(s) will incorporate into the reaction product according to the deficiency of P$_2$O$_5$, so it is not desirable. But at a P$_2$O$_5$/Al$_2$O$_3$ mole ratio not lower than 0.8 there will be obtained a crystalline AlPO$_4$ of a quality not causing problem in some particular use as in the production of glasses.

The concentration of the aqueous phosphoric acid solution used in the present invention is suitably not higher than 64% by weight as P$_2$O$_5$ (all the percentages in the following description indicate percentages by weight unless otherwise specified). The reaction of phosphoric acid and aluminum compound(s) is essentially a dehydration reaction as will be apparent, for example, from the following reaction formula:

$$Al_2O_3 + 2H_3PO_4 \rightarrow 2AlPO_4 + 3H_2O$$

Generally, therefore, the higher the concentration of the aqueous phosphoric acid solution, the higher the reaction rate and therefore the more desirable. In the present invention, however, if there is used a highly concentrated aqueous phosphoric acid solution with a $P_2O_5$ concentration exceeding 64%, a block-like agglomerate is apt to be formed during reaction and it makes agitation of the reaction system difficult, so such a high concentration is not desirable. On the other hand, as to an appropriate lower limit of the phosphoric acid concentration, there is no special limitation. A lower phosphoric acid concentration is desirable in order to obtain a finer particulate crystalline $AlPO_4$. However, if the concentration of the aqueous phosphoric acid solution is too low, the reaction rate will be decreased and it becomes necessary to increase the capacity of the reaction apparatus. Therefore, its lower concentration also reaches a limit inevitably in practical use, provided the process of the present invention is feasible at its concentration not lower than 5% as $P_2O_5$.

As the organic solvent used in the present invention, there may be used any organic solvent if only it is incompatible with the aqueous phosphoric acid solution and can form two phases. If it has a boiling point not lower than 60° C. at atmospheric pressure, it is very convenient for operations. If its boiling point is lower than 60° C., the reaction of phosphoric acid and aluminum compound(s) will not take place to a satisfactory extent and unreacted aluminum compound(s) will remain in the resultant aluminum phosphate, so it is not desirable.

Whether the organic solvent is suitable or not can differ according to the selection of a variable of state, but generally the following organic solvents may be mentioned as suitable examples in working the present invention: aromatic and aliphatic hydrocarbons such as benzene, toluene, xylene, heptane, octane, decane, various petroleum naphthas and industrial gasolines; alcohols such as iso-butyl alcohol and n-amyl alcohol; ethers such as ethyl butyl ether and various cellosolves and carbitols which form two phases with water; ketones such as methyl ethyl ketone and methyl isobutyl ketone. These are merely examples of organic solvents employable in the present invention and are not intended to establish a limitation.

An appropriate amount of the organic solvent used differs according to the kind of the organic solvent, concentration of the aqueous phosphoric acid solution and stirring conditions in the reaction, but under any condition it is desirable to use the organic solvent in an amount two times or more in weight ratio based on the amount as $Al_2O_3$ of the aluminum compound(s). A smaller amount thereof is not desirable because it would make agitation of the reaction system difficult. Its upper limit is not specially limited, but usually its amount up to 10 times or so on the same basis is sufficient.

As previously noted, the conventional methods for producing a crystalline $AlPO_4$ requires calcination at a high temperature over a long period of time. On the other hand, in the method of the present invention, the reaction is carried out at a low temperature in the presence of the organic solvent and the resultant crystals are filtered off and dried, therefore the consumption of heat energy is minimized and it is sufficient for the manufacturing apparatus to be made of an ordinary glass or stainless steel material. The reaction temperature is in the range of about 60° to 120° C. Usually, a reflux temperature is adopted.

Further, it is to be noted that, as shown in the later-described working examples, the impurity content of the resulting $AlPO_4$ is much lower than the value estimated from the impurity content of the aluminum compound(s) used. Although the details of this mechanism are not clear yet, it is presumed that part of the impurities derived from the starting material shifts into the organic solvent and as a result there is obtained $AlPO_4$ of an unexpectedly high purity.

Thus, the present invention made it possible to produce inexpensively a high purity crystalline $AlPO_4$ a simple production of which has heretofore been difficult, and thus it is of great industrial value.

Further, the aluminum phosphate obtained according to the method of the present invention is in the form of fine particulate (1-100μ) crystals, and upon close observation it is found that the particle surface thereof is covered with innumerable wrinkles, thus giving a wide surface area. The aluminum phosphate having such characteristics is extremely suitable as a catalyst material and an electronic material.

The following working examples are given to illustrate the present invention more definitely, but the invention is not limited thereto as long as its gist is not changed.

EXAMPLE 1

78 g. of aluminum hydroxide (gibbsite type), 145 g. of an aqueous phosphoric acid solution ($P_2O_5$ concentration: 54%) and 250 g. of benzene were charged into a flask and the temperature was raised under stirring, then after heating for about 1 hour at a temperature not higher than the reflux temperature (73° C.), the water in the reaction system was removed azeotropically with benzene and dehydration was performed while adding benzene into the system in an amount corresponding to the distilled-off benzene and water. As the dehydration proceeded, the internal temperature rose, and when the internal temperature exceeded 80° C., the heating was discontinued to stop dehydration. After cooling, the product (precipitate) was separated from the solvent by filtration and then dried to give a finely divided white powder. According to X-ray diffraction pattern of this powder, main peaks were observed at diffraction angles of $2\theta = 26.4°$, 20.8°, 49.7°, which coincided with the characteristic diffraction peaks of berlinite type $AlPO_4$ described in ASTM card 10-423. Its average particle diameter was about 50 microns. Its analytical results are shown in Table 2.

EXAMPLES 2-6

Aluminum hydroxide (gibbsite type), aluminum oxide ($Al_2O_3$, percent alpharization: 85%), an aqueous phosphoric acid solution ($P_2O_5$ 54%) and organic solvents were fed under the conditions set out in Table 1, and as to the other conditions than those shown in Table 1, the conditions described in Example 1 were followed, to obtain crystalline $AlPO_4$'s, whose yields and analytical results are as shown in Table 2.

Reference to Tables 1 and 2 clearly shows that according to the present invention there are obtained crystalline $AlPO_4$'s nearly quantitatively at relatively low temperatures below 200° C. and that in comparison with the conventional $AlPO_4$ they are of high purity having a content of such impurities as $Fe_2O_3$ and $Na_2O$ fairly lower than that estimated from the analysis of the aluminum compounds used.

TABLE 1

| Example | | 1 | 2 | 3 | 4 | 5 | 6 |
|---|---|---|---|---|---|---|---|
| Material Blending Ratio (g) | Aluminum hydroxide | 78 | 78 | 78 | 78 | — | — |
| | Aluminum oxide | — | — | — | — | 56 | 56 |
| | Aqueous phosphoric acid solution (54%) | 145 | 145 | 138 | 138 | 145 | 145 |
| | Benzene | 250 | — | — | — | — | — |
| | iso-Butanol | — | 200 | — | — | — | — |
| | Methyl isobutyl ketone | — | — | 250 | — | — | — |
| | Xylene | — | — | — | 200 | — | — |
| | Mineral spirit | — | — | — | — | 250 | — |
| | #150* | — | — | — | — | — | 250 |
| Reflux temperature (°C.) | | 73 | 91 | 90 | 97 | 101 | 104 |
| Dehydration end temperature (°C.) | | 80 | 104 | 115 | 138 | 167 | 192 |

*Aromatic solvent (a product of Esso Standard Sekiyu K.K.)

TABLE 2

| | Example | 1 | 2 | 3 | 4 | 5 | 6 | Commercial Reagent $AlPO_4$ | Aluminum Compound* Aluminum Hydroxide | Aluminum Compound* Aluminum Oxide |
|---|---|---|---|---|---|---|---|---|---|---|
| | Yield of $AlPO_4$ (g) | 122 | 120 | 120 | 121 | 120 | 120 | | | |
| Chemical Analysis | $Al_2O_3$ (wt %) | 40.0 | 40.5 | 41.0 | 40.8 | 41.2 | 41.1 | 41.5 | 65.3 (40.0) | 99.8 (40.0) |
| | $P_2O_5$ (wt %) | 55.5 | 56.5 | 57.1 | 56.9 | 57.6 | 57.4 | 58.1 | — | — |
| | $Fe_2O_3$ (ppm) | 27 | 25 | 23 | 28 | below 10 | below 10 | 160 | 70 (43) | below 50 |
| | $SiO_2$ (ppm) | 104 | 98 | 95 | 115 | 300 | 310 | 420 | 180 (110) | 800 (320) |
| | $TiO_2$ (ppm) | below 100 | ← | ← | ← | ← | ← | 130 | below 50 | below 50 |
| | $Na_2O$ (ppm) | 250 | 220 | 270 | 290 | below 10 | below 10 | 620 | 2800 (1700) | below 50 |
| | MgO (ppm) | below 5 | ← | ← | ← | ← | ← | 110 | — | — |
| | CaO (ppm) | below 10 | ← | ← | ← | ← | ← | 533 | — | — |

*The parenthesized values show analytical values of the aluminum compounds based on 40.0% $Al_2O_3$ content for facilitating comparison with that of $AlPO_4$.

What is claimed is:

1. A method for preparing a fine particulate $AlPO_4$ which comprises reacting an aqueous phosphoric acid solution with an aluminum compound selected from the group consisting of an aluminum hydroxide and an aluminum oxide, wherein the molar ratio of phosphoric acid to the aluminum compound is in the range of 0.8 to 1.8 in terms of $P_2O_5/Al_2O_3$, said reaction being performed under stirring at an elevated temperature in an organic solvent capable of forming two phases with water, said solvent having a boiling point not lower than 60° C. under atmospheric pressure, and being present in at least two times the weight ratio, based on the amount of $Al_2O_3$, of the aluminum compound.

2. The method of claim 1 wherein the reaction is carried out under reflux, and the water in the system is distilled off azeotropically with its organic solvent.

3. The method of claim 2 wherein the reaction is carried out under addition of the organic solvent as water and organic solvent are distilled off.

4. The method of claim 1 wherein said organic solvent is an aromatic hydrocarbon, an aliphatic hydrocarbon, an alcohol, an ether, or a ketone.

5. The method of claim 1 wherein the concentration of said aqueous phosphoric acid solution is not higher than 64 weight percent.

6. The method of claim 1 wherein the mole ratio of the phosphoric acid to the aluminum compound is in the range of 1.0 to 1.3 in terms of $P_2O_5/Al_2O_3$.

* * * * *